(12) United States Patent
De Sanzo

(10) Patent No.: US 8,536,997 B2
(45) Date of Patent: Sep. 17, 2013

(54) VEHICLE LIGHTING CONTROL APPARATUS AND METHOD

(75) Inventor: David Joseph De Sanzo, Waterford, PA (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 12/855,092

(22) Filed: Aug. 12, 2010

(65) Prior Publication Data
US 2012/0038474 A1 Feb. 16, 2012

(51) Int. Cl.
*B60Q 1/26* (2006.01)

(52) U.S. Cl.
USPC ........... 340/468; 340/469; 340/471; 340/472; 340/539.22; 340/539.26

(58) Field of Classification Search
USPC ............... 340/426.16, 456, 458, 469, 539.13, 340/539.22, 539.26; 362/464–466; 342/69; 315/82
See application file for complete search history.

(56) References Cited

U.S. PATENT DOCUMENTS

| | | | | |
|---|---|---|---|---|
| 1,432,172 | A * | 10/1922 | Fitzgerald et al. | 362/534 |
| 2,045,045 | A * | 6/1936 | Moore | 74/491 |
| 3,769,519 | A * | 10/1973 | Adamian | 307/10.8 |
| 3,775,639 | A | 11/1973 | Woodward | |
| 4,117,453 | A | 9/1978 | Hodgson et al. | |
| 4,139,801 | A * | 2/1979 | Linares | 315/83 |
| 4,599,544 | A | 7/1986 | Martin | |
| 4,684,819 | A | 8/1987 | Haag et al. | |
| 4,686,423 | A | 8/1987 | Eydt | |
| 4,727,290 | A | 2/1988 | Smith et al. | |
| 4,843,370 | A * | 6/1989 | Milde, Jr. | 340/466 |
| 4,862,037 | A | 8/1989 | Farber et al. | |
| 4,891,559 | A | 1/1990 | Matsumoto et al. | |
| 4,968,896 | A | 11/1990 | Shibata et al. | |
| 5,039,038 | A * | 8/1991 | Nichols et al. | 246/3 |
| 5,124,549 | A | 6/1992 | Michaels et al. | |
| 5,173,681 | A | 12/1992 | Shockley et al. | |
| 5,182,502 | A | 1/1993 | Slotkowski et al. | |
| 5,188,038 | A * | 2/1993 | Shanley | 105/216 |
| 5,329,206 | A | 7/1994 | Slotkowski et al. | |
| 5,592,146 | A * | 1/1997 | Kover, Jr. | 340/468 |
| 5,614,788 | A * | 3/1997 | Mullins et al. | 315/82 |
| 5,666,028 | A * | 9/1997 | Bechtel et al. | 315/82 |
| 5,796,094 | A * | 8/1998 | Schofield et al. | 250/208.1 |
| 6,370,475 | B1 * | 4/2002 | Breed et al. | 701/301 |
| 6,429,594 | B1 | 8/2002 | Stam et al. | |
| 6,518,704 | B1 * | 2/2003 | Schuler | 315/82 |
| 6,583,734 | B2 * | 6/2003 | Bates et al. | 340/988 |

(Continued)

FOREIGN PATENT DOCUMENTS

DE 102004057323 A1 * 6/2006
WO WO 2010089596 A2 * 8/2010

*Primary Examiner* — Daniel Wu
*Assistant Examiner* — Son M Tang
(74) *Attorney, Agent, or Firm* — GE Global Patent Operation; John A. Kramer

(57) ABSTRACT

An apparatus is provided for operating a lighting system of the type including one or more lighting devices disposed on an off-highway vehicle. The apparatus includes: one or more input devices, operable to detect an operating condition of the off-highway vehicle and to generate a signal thereof; and a lighting controller operatively coupled to the input devices and to the lighting devices. The lighting controller is programmed to selectively power the lighting devices from an electrical power source of the off-highway vehicle based on predetermined responses to the signals from the input devices.

27 Claims, 6 Drawing Sheets

(56) References Cited

U.S. PATENT DOCUMENTS

| | | | |
|---|---|---|---|
| 6,587,573 B1* | 7/2003 | Stam et al. ................ 382/104 |
| 6,593,698 B2 | 7/2003 | Stam et al. |
| 6,611,610 B1 | 8/2003 | Stam et al. |
| 6,653,614 B2 | 11/2003 | Stam et al. |
| 6,653,615 B2 | 11/2003 | Bechtel et al. |
| 6,728,393 B2 | 4/2004 | Stam et al. |
| 6,774,988 B2 | 8/2004 | Stam et al. |
| 6,861,809 B2 | 3/2005 | Stam et al. |
| 6,868,322 B2 | 3/2005 | Stam et al. |
| 6,900,594 B1* | 5/2005 | Reichert et al. ............. 315/83 |
| 6,906,467 B2 | 6/2005 | Stam et al. |
| 6,919,548 B2 | 7/2005 | Stam et al. |
| 6,924,470 B2 | 8/2005 | Bechtel et al. |
| 6,928,180 B2 | 8/2005 | Stam et al. |
| 6,935,763 B2* | 8/2005 | Mueller et al. ............. 362/276 |
| 6,947,576 B2 | 9/2005 | Stam et al. |
| 6,947,577 B2 | 9/2005 | Stam et al. |
| 7,149,613 B2 | 12/2006 | Stam et al. |
| 7,302,326 B2 | 11/2007 | Stam et al. |
| 7,567,864 B2* | 7/2009 | Ziehr et al. ................. 701/49 |
| 7,911,360 B2* | 3/2011 | Janke ......................... 340/902 |
| 8,070,332 B2* | 12/2011 | Higgins-Luthman et al. ................... 362/465 |
| 8,162,518 B2* | 4/2012 | Schofield ................... 362/466 |
| 8,295,992 B2* | 10/2012 | Ecton et al. .................... 701/2 |
| 2007/0147055 A1* | 6/2007 | Komatsu ..................... 362/464 |
| 2010/0213846 A1* | 8/2010 | Thomas ......................... 315/82 |
| 2011/0108677 A1* | 5/2011 | Asuka et al. ................... 246/27 |
| 2011/0172856 A1* | 7/2011 | Kull ............................. 701/19 |

\* cited by examiner

VEHICLE LIGHTING CONTROL APPARATUS AND METHOD

BACKGROUND OF THE INVENTION

Embodiments of this invention relate generally to trains and other off-highway vehicles, and more particularly to control of lighting systems thereof.

Locomotives and similar rail vehicles include lighting systems with numerous lights and groups of lights. In prior art practice, the locomotive operator manually controls the locomotive lights through the use of switches or circuit breakers typically located in the cab of the locomotive. Different parts of the lighting system have different requirements for operation, both in terms of practical requirements and in existing railroad operating rules.

Manual operation presents a high operator workload and can lead to unsafe situations and increased maintenance requirements and fuel consumption. For example, locomotive headlights are often left in a "dim" or "high" illumination level when the locomotive is either not in service or when operating procedures require it to be extinguished. This decreases the life of the bulbs and increases fuel consumption.

Accordingly, it would be advantageous to automate operation of locomotive or other rail vehicle lighting systems.

BRIEF SUMMARY OF THE INVENTION

The present invention provides apparatus and methods for operating vehicle lighting systems without direct operator intervention.

According to one aspect of the invention, an apparatus is provided for operating a lighting system of the type including one or more lighting devices disposed on an off-highway vehicle. The apparatus includes: one or more input devices, operable to detect an operating condition of the off-highway vehicle and to generate a signal thereof; and a lighting controller operatively coupled to the input devices and to the lighting devices. The lighting controller is programmed to selectively power the lighting devices from an electrical power source of the off-highway vehicle based on predetermined responses to the signals from the input devices.

According to another aspect of the invention, an apparatus is provided for operating a consist of two or more off-highway vehicles which are mechanically coupled together, each off-highway vehicle having a lighting system including one or more lighting devices. The apparatus includes: one or more input devices carried by on each off-highway vehicle, each of the input devices operable to detect an operating condition of the off-highway vehicle and to generate a signal thereof; and a lighting controller carried by each off-highway vehicle and operatively coupled to the input devices and to the lighting devices of that off-highway vehicle; a communications channel operable to transfer data between the lighting controllers; and apparatus operable to designate one of the off-highway vehicles as a lead unit and the remaining off-highway vehicles as trailing units. Each of the lighting controllers is programmed to selectively power the lighting devices of the associated off-highway vehicle from an electrical power source of the off-highway vehicle based on predetermined responses to the signals from the input devices of the lead unit which are transmitted over the communications channel from the lighting controller of the lead unit to the remaining lighting controllers in the consist.

According to another aspect of the invention, a method is provided for operating a lighting system of the type including one or more lighting devices disposed on an off-highway vehicle. The method includes: using one or more input devices disposed on the off-highway vehicle to generate a signal indicative of a operating condition of the off-highway vehicle; receiving the signals at a lighting controller operatively coupled to the lighting devices; and using the lighting controller, coupling the input devices to the electrical power source based on predetermined responses to the signals from the input devices.

BRIEF DESCRIPTION OF THE DRAWINGS

The invention may be best understood by reference to the following description taken in conjunction with the accompanying drawing figures in which.

DETAILED DESCRIPTION OF THE INVENTION

The concepts embodied in the present invention are broadly applicable to any off-highway vehicle (OHV) that utilizes one or more lights or groups of lights. As used herein, the term "off-highway vehicle" refers to vehicles such as locomotives and other railroad power units, other rail vehicles, mining trucks or other construction or excavation vehicles, agricultural vehicles, and the like. Complex lighting systems are most commonly found in railroad locomotives; accordingly, the details of the invention will be explained using a locomotive as an example.

Figure 1:
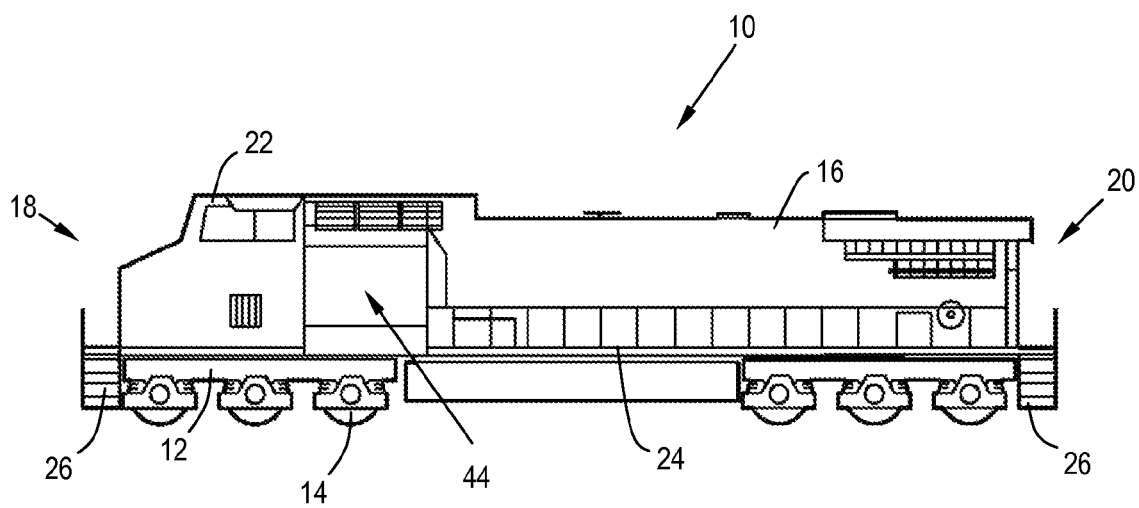
FIG. 1 is a schematic side view of a locomotive incorporating a lighting system and control apparatus constructed according to an aspect of the present invention.
Figure 2:
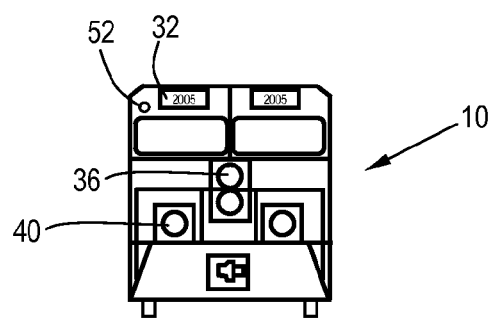
FIG. 2 is a front view of the locomotive of FIG. 1.
Figure 3:
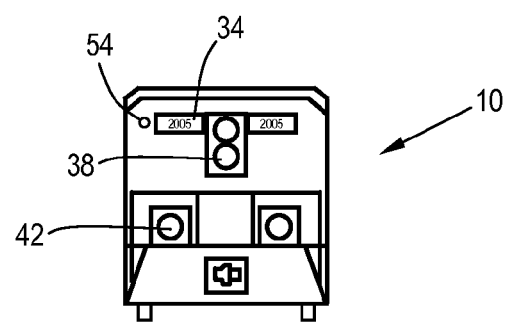
FIG. 3 is a front view of the locomotive of FIG. 1.

Now, referring to the drawings wherein identical reference numerals denote the same elements throughout the various views, FIGS. 1-3 depict a locomotive 10. While not shown, it will be understood that, in accordance with conventional practice, the locomotive 10 includes a combustion engine, specifically a diesel engine, which drives an alternator. The alternator provides electrical power to traction motors, which are mounted in bogies 12 in order to drive wheels 14. This type of drivetrain is often referred to as a "series hybrid" system. The engine is also coupled to one or more auxiliary alternators or generators, which are in turn coupled to an electrical power distribution bus. The locomotive 10 has a body 16 with front and rear ends 18 and 20 respectively. An operator's cab 22 is located at the front end 18. A walking platform 24 surrounds the body 16 and is accessed through sets of steps 26 located near the front and rear of the body 16.

The locomotive 10 is provided with numerous lights and groups of lights for illuminating various areas in and around the locomotive 10. Collectively these lights are referred herein to as a "lighting system" (see item 28 in FIG. 4), with the understanding that individual lights within the lighting system 28 may be operated independently, and that the lighting system of a specific locomotive 10 may or may not include every type of light described herein. It will understood that the terms "light" or "lighting device" are used interchangeably herein, and that either term refers to any type of device capable of emitting visible light when electrically powered. Nonlimiting examples of lights or lighting devices include light sources such as incandescent light bulbs, fluorescent or neon light tubes, arc and vapor lamps, light emitting diodes, visible lasers, and electroluminescent displays. With reference to FIGS. 1 and 2, typical lighting devices which make up the lighting system 28 are summarized as follows:

Platform lights 30 (also referred to as step lights, shown schematically in FIG. 4) are installed in selected locations around the exterior of the locomotive 10 to illuminate the platform 24 and the steps 26 in low-light conditions for increased safety of railroad personnel.

Cab lights 31 (shown schematically in FIG. 4) are installed in selected locations in the interior of the locomotive cab 22. The cab lights 31 illuminate this area of the locomotive 10 for increased safety of railroad personnel and provide illumination for the train crew and maintenance personnel when required.

The locomotive 10 can have one or more display and interface units installed in the cab 22. The locomotive operator display and interface unit generally refers to an electronic device (not shown) that is used by the locomotive crew to control and monitor various electrical and mechanical systems installed on the locomotive 10. In lieu of an operator display and interface unit, the cab 22 may be equipped with individual analog or digital gauges that monitor various systems. A locomotive 10 can also contain a combination of any of the above-mentioned types. The display and interface unit and/or gauges are lighted with operator display lights 33 (shown schematically in FIG. 4).

Illuminated front and rear number boards 32 and 34 are installed on the front and rear of the locomotive 10, respectively. Number boards 32 and 34 contain a road number assigned to uniquely identify the locomotive 10.

The locomotive 10 is equipped with a front headlight 36 mounted on the body 16 at the front end 18, and a rear headlight 38 mounted at the rear end 20. the headlights 38 and 38 are used to illuminate the tracks ahead of the locomotive 10 in the direction of movement. The headlights 36 and 38 are also used as a visual indicator, day or night, to alert others on or near the tracks of an approaching train.

Existing railroad operating rules typically dictate that the headlight which is facing the direction of movement be illuminated on at a relatively high level of illumination, corresponding to a "high" or "bright" switch setting, in the direction of movement on a single locomotive or on a lead unit in a consist. As used in the rail industry, a "consist" is a group of two or more locomotives or other power units in a train. A consist is controlled from a locomotive in the front of the consist or the locomotive facing the direction of travel which is designated as the "lead unit" and houses the train crew. In some instances, a lead unit is not located at the front of a train; thus, "lead unit" refers generally to a locomotive that is designated for consist control, which may or may not be located at the front of a train. The remaining units in the consist are commonly referred to as trailing units.

Railroad operating rules typically dictate that the headlights be extinguished when the locomotive 10 meets any of the following conditions: when it is a trailing unit in locomotive consist; when standing to be met or passed by another train; when it is standing on a track other than the main track; when it is stopped at junctions, meeting points, or terminals at night when an opposing train is approaching; or when it is moving and the headlight in question is not facing the locomotive's of movement.

In addition, railroad operating rules typically dictate that the front headlight 36 be operating at a relatively low level of illumination, corresponding to a "dim" switch setting, when the locomotive 10 meets any of the following conditions: when operating within yard limits; when passing another train operating in the opposite direction in multiple track territory; when standing close behind another train; when approaching stations with passenger stops; and when approaching junctions, meeting points, or terminals.

If the headlight 36 or 38 facing the direction of travel is not on high setting when the locomotive 10 is moving, it makes for a very dangerous condition. In contrast, if the headlights 36 and 38 are not dimmed when passing other trains or when operating in yard limits, it may cause a blinding condition and create a safety hazard as well.

The locomotive 10 is equipped with front and rear ditch lights 40 and 42, located at the front and rear ends 18 and 20, respectively. They are mounted either above or below the locomotive platform 24. The ditch lights 40 and 42 augment the locomotive's headlights 36 and 38 to create a triangular light pattern to increase detection distance at grade crossings. In prior art use, the ditch lights 40 and 42 are typically operated in a steady on mode when the locomotive 10 is moving. The ditch light control circuit is also typically connected to the locomotive horn. When the locomotive horn is activated, the ditch lights 40 and 42 change from steady state mode to flashing for a set period of time. Railroad operating rules typically dictate that the ditch lights 40 and 42 be illuminated steady under one or more of the following conditions: when the associated headlight 36 or 38 is on high or bright; or when the locomotive 10 is approaching or operating over crossings at grade.

Railroad operating rules typically dictate that the ditch lights 40 and 42 be flashing under one or more of the following conditions: when the locomotive 10 is at a whistle post; when the locomotive 10 is at a specified distance from crossing at grade; or when the locomotive 10 is at a specified distance from crossing at grade and the locomotive's speed exceeds a specified limit In addition, railroad operating rules typically dictate that the ditch lights 40 and 42 be extinguished under the following conditions: when the associated headlight is off or dimmed; when the locomotive 10 is stopped at junctions, meeting points, or terminals; when the locomotive 10 is passing another train operating in the opposite direction in multiple track territory; when the locomotive 10 is operating within yard limits; when the locomotive 10 is approaching a station with a passenger stops; and when the locomotive is approaching junctions, meeting points, or terminals.

Engine compartment lights (shown schematically at 43 in FIG. 44) are installed inside the equipment cabinets 44 (see FIG. 1) located on the inside or outside of the locomotive car body 16. The engine compartment lights provide illumination when railroad personnel need to access these areas. Railroad operating rules typically dictate that the engine compartment lights be illuminated at night or as required for increased visibility and extinguished during the daylight hours.

In prior art practice, all of the lights and groups of lights described above are typically controlled manually, using a switch or circuit breaker. Manual operation provides a chance for error as well as shortening bulb life and increasing fuel consumption when lights are left on unnecessarily. For some of the lights, particularly the front and rear headlights 36 and 38, if the correct position is not selected, it makes for hazardous condition. Specifically, if the headlights 36 and 38 are not on high or bright when the locomotive 10 is moving, visibility is reduced and a collision risk is created. In contrast, if the headlights 36 and 38 are not dimmed when passing other trains or when operating in yard limits, it may cause a blinding condition and create a safety hazard as well.

Figure 4:
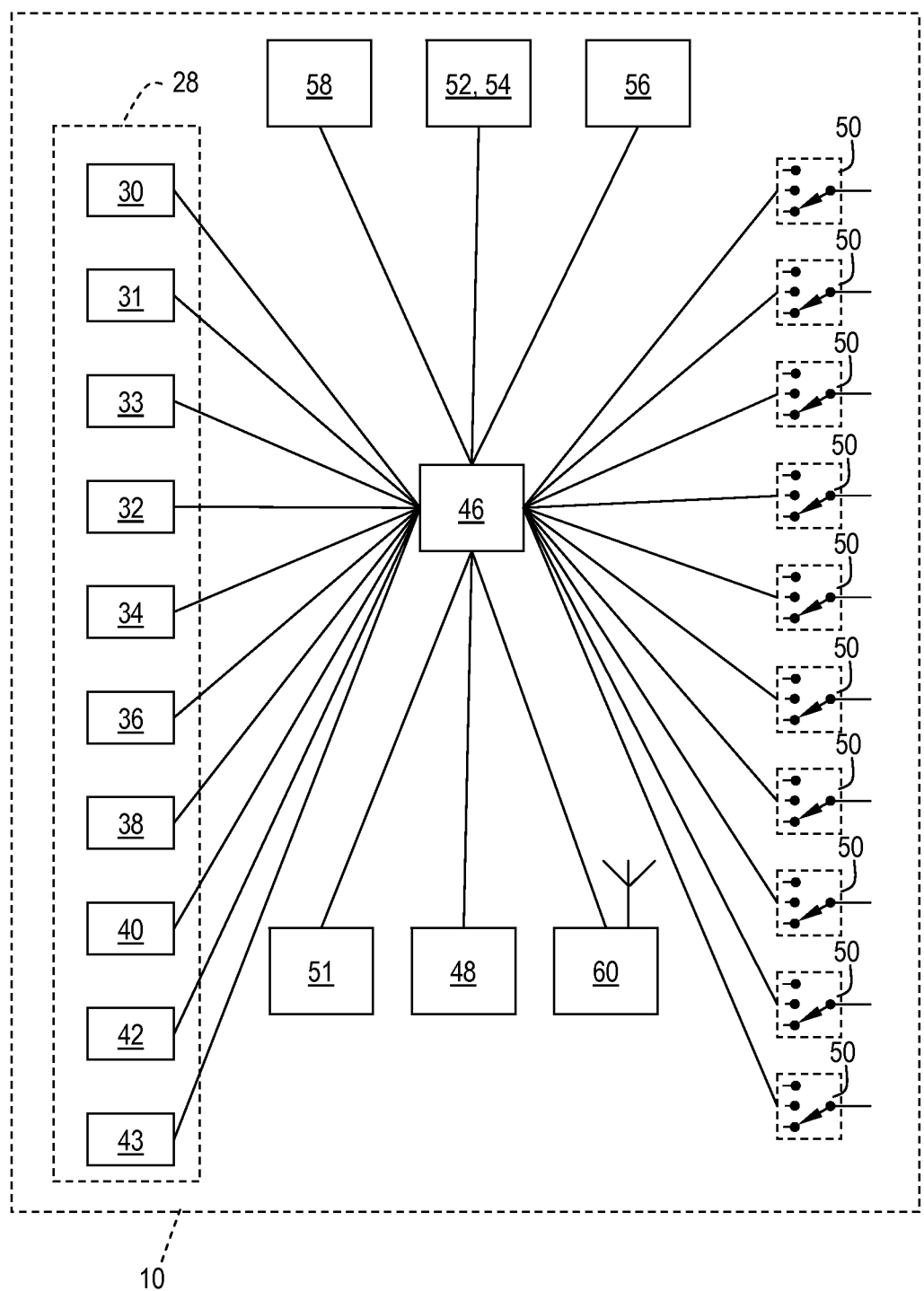
FIG. 4 is a schematic diagram illustrating a lighting control apparatus constructed according to an aspect of the present invention.

FIG. 4 illustrates a lighting control apparatus suitable for providing automated control of the lighting system 28 described above. The functional connections between components are shown in a schematic manner, with the understanding that lines drawn between components are representative of electrical conductors, wireless connections, or the like. The apparatus includes a lighting controller 46 which is coupled to a power source 48 such as an existing electrical bus of the locomotive 10. The lighting controller 46 is also coupled to the lighting system 28. The lighting controller 46 includes appropriate switches, relays, or other components suitable for selectively providing electrical power from the power source 48 to the individual elements of the lighting system 28. The lighting controller 46 also includes a suitable device and/or processors for executing programmed commands, such as a programmable logic controller (PLC) or microcomputer. For certain functions relays, solid-state devices, and/or hard-wired circuit logic may be used in lieu of a programmable control. Therefore, as used herein, the term "programmed" refers both to functional capabilities carried out by hardwired circuits as well as steps stored in a software program. As illustrated, the lighting controller 46 is a separate component installed in the locomotive 10. It is also envisioned that the lighting controller 46 could be integrated into an existing locomotive control system or unit (not shown).

The lighting controller 46 is provided with a plurality of sensor and control inputs. A switch 50 is provided corresponding to each of the individual lighting system components. Each of the switches includes an "off" position, one or more manual settings corresponding to various illumination levels (e.g., "dim", "high" or "bright", "high plus ditch"), and an automatic or "auto" position in which lighting control is carried out automatically by the lighting controller 46. Switch connections to the various components of the lighting system 28 may be grouped as desired to provide sufficient independence of control while minimizing the cost and number of separate switches 50 required. Furthermore, the switches 50 may take the form of hardware devices or may be represented by graphical icons or virtual software "buttons" coupled to the lighting controller 46.

A positioning unit 51 is installed in the locomotive 10 and coupled to the lighting controller 46. In the illustrated example, the positioning unit 51 comprises a Global Positioning System ("GPS") receiver interface module (RIM) connected to an antenna, but other known devices or systems such as differential GPS, LORAN, inertial navigation systems ("INS"), wheel tachometers, or wayside transponders could be used in lieu of or in addition to GPS to determine the location of the locomotive and to provide position information. The positioning unit 51 may be considered an input device for the lighting controller 46.

One or more photoelectric sensors or other sensors operable to generate a signal responsive to the ambient light level are coupled to the lighting controller 46. For example, front and rear photoelectric sensors 52 and 54 may be co-located with existing structure such as the number boards 32 and 34. The photoelectric sensors 52 and may be considered input devices for the lighting controller 46.

A conventional reverser 56 is mounted in the cab 22 of the locomotive. The reverser 56 has four unique configurations: (1) reverser handle removed; (2) reverser handle installed and in a center position; (3) reverser handle installed and in a forward position; and (4) reverser handle installed and in a reverse position. The primary purpose of the reverser 56 is to control the direction of movement of the locomotive 10. The status of the reverser 56 is communicated to the lighting controller 46. The reverser 56 may be considered an input device for the lighting controller 46.

An external programming device 58 such as a "laptop" type personal computer may be connected to the lighting controller 46 via a wired or wireless connection.

The lighting controller 46 may also be coupled to a transceiver 60 which functions to receive and transmit data to an offboard unit, described in more detail below.

The input devices described above have the common characteristic that each is operable to determine an operating characteristic of the locomotive 10 and send a signal indicative of that condition to the lighting controller 46. The apparatus described above may be used to implement various control methods for the lighting system 28, based on signals from one or more of the input devices. Each of these methods involves controlling the lighting system 28 in an automated fashion, or in other words without direct operator intervention as to the operating state of a specific lighting device. Examples of the kinds of methods that may be implemented are generally referred to herein as geo-zone control, photoelectric sensor control, and locomotive control, each of which will be described in turn. It will be understood that the control apparatus need contain only the components required for a particular method. For example, if geo-zone control is not implemented, then the positioning unit 51 may be eliminated.

Figure 5:
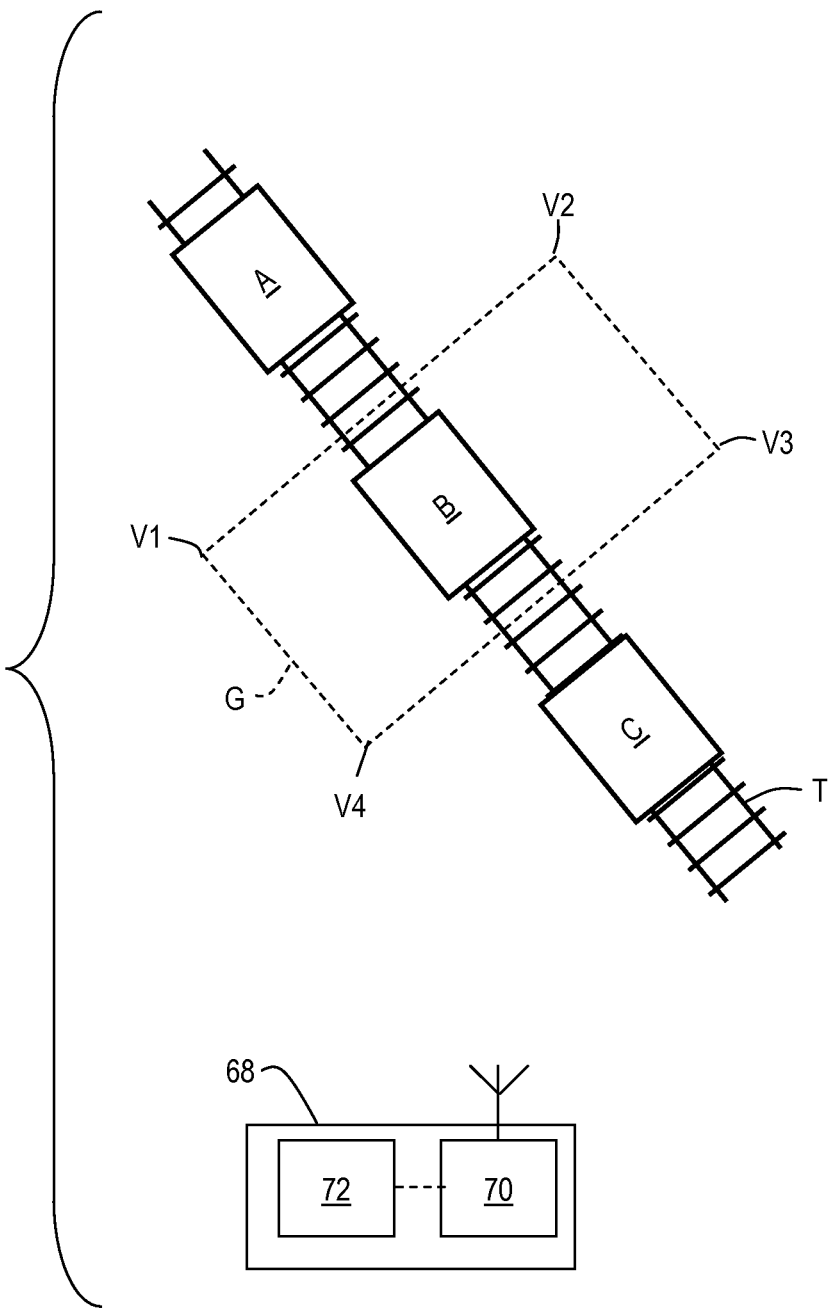
FIG. 5 is a schematic plan view diagram showing a locomotive positioned within a geo-zone.

According to one aspect of the invention, the lighting system 28 may be controlled by reference to one or more "geozones". As used herein, a "geo-zone" refers to a virtual geographic boundary defined by two or more points drawn around a designated land area. These points represent vertices consisting of one or more pairs of latitude and longitude coordinates. The vertices of a geo-zone are connected with virtual lines that represent the boundaries of the geo-zone. Each geo-zone is typically assigned a unique identification number. The geo-zones may be stored in the lighting controller 46. A geo-zone can represent numerous entities on the railroad such as rail yards, yard limits, sidings, customer locations, grade crossings, crossovers, or passenger stations. FIG. 5 shows an example of a geo-zone "G" with vertices labeled V1-V4. A track "T" runs through the geo-zone G.

In operation, the positioning unit 51 transmits the locomotive's current position (for example in the form of a unique latitude and longitude coordinate pair), to the lighting controller 46. The lighting controller 46 determines if the locomotive's current geographic location is inside or outside of the geo-zone G. If the locomotive 10 is inside the geo-zone G, the lighting controller 46 illuminates the required lights of the lighting system 28 at the required levels, in accordance with prior programming.

An example of geo-zone based operation is describe with reference to FIG. 5 where the letters A, B, and C represent sequential positions of a locomotive 10 as it moves along the track T. With the switch 50 associated with the front headlight 36 in an auto position, the front headlight 36 is brightly illuminated (high setting) when the locomotive 10 is located outside geo-zone G (position A). As the locomotive 10 travels down the track T and into a rail yard, represented by geo-zone G, the lighting controller 46 determines that the locomotive's current location is inside the geo-zone G (position B). Based on previous programming, and consistent with known railroad operating rules, the lighting controller 46 causes front headlight brightness to change from high to dim. The lighting controller 46 can also be programmed to prevent the ditch lights 40 and 42 from illuminating, satisfying a concurrent railroad operating rule requirement. When the locomotive 10 leaves the geo-zone G (position C), the lighting controller 46 returns the front headlight brightness to high.

The lighting system 28 may also be controlled by reference to geo-zones using offboard equipment. This type of control would operate as described above, except that one or more offboard (e.g., wayside) communication centers 68 would be provided, shown schematically in FIG. 5. Each communication center 68 includes one or more transceivers 70 coupled to one or more offboard computers 72 programmed to process and control the lighting systems 28 of the locomotive 10 in response to selected inputs and prior programming. A geo-zone database may be installed on the offboard computer 72.

The locomotive's positioning unit 51 would transmit the locomotive's current position to the offboard computer 72 via the transceiver 60. The offboard computer 72 would then determine whether the locomotive's current geographic location is inside or outside of a geo-zone G. If the locomotive 10 is inside a geo-zone G, the geo-zone identification ("ID") is transmitted back to the locomotive 10, again via a wireless communication link. The lighting controller 46 is programmed with the required actions to take on the locomotive lighting system 28 based on the identification of the specific geo-zone G. The locomotive's position may be transmitted at regular intervals and the lighting system commands updated in response to subsequent offboard computer responses.

Alternatively, the offboard computer 72 may include both the geo-zone database and the required action to invoke on the locomotive lighting system 28. If the offboard computer 72 determines the locomotive 10 is in a geo-zone, the offboard computer 72 transmits to the locomotive 10, via a wireless communication link, the required action to take on the locomotive lighting system 28.

In addition to or on lieu of geo-zone control, the photoelectric sensors 52 and 54 may be used to control designated parts of the lighting system 28 whose state (i.e. on or off) is determined by exterior ambient light. This method of control is particularly applicable to the platform lights 30, cab lights 31, operator display lights 33, engine compartment lights 43, and front and rear illuminated number boards 32 and 34.

With the associated switch 50 is in the auto position, the lighting controller 46 supplies power to the platform lights 30 whenever the light detected by the photoelectric sensor 52 or 54 reaches a low level threshold. Whenever a high level threshold is reached, power is disconnected from the platform lights 30. Reverse logic is also applicable wherein a low level threshold is used to extinguish the lights and a high level threshold is used to illuminate the lights. The sensitivity or high and low thresholds can be adjusted by a switch or similar control or through the external programming device 58. An identical circuit may be provided for each portion of the lighting system which is to be separately controlled in this manner. With the pertinent switch 50 in the auto position, power is supplied to the designated lighting system causing them to illuminate whenever the locomotive control system or an external controller reaches a low level threshold.

When coupled to the lighting controller 46 as described above, the photoelectric sensors 52 and 54 may also be used to control the front and rear headlights 36 and 38 or other lights which operate at different light levels. In particular, signals from the front photoelectric sensor 52 are used to control the front headlight 36. When the locomotive 10 is operating in the forward direction in low to no light conditions, and the associated switch 50 is "auto" setting, the lighting controller 46 will illuminate the front headlight 36 at a high intensity. In this case the default behavior of the circuit supplying the front headlight 36 would be to provide high-level illumination equal to the "high" setting, when the output from the front photoelectric sensor 52 is below a high level limit. When the front photoelectric sensor 52 exceeds the high level limit, the lighting controller 46 will switch the front headlight 36 to lower intensity operation, equivalent to a "dim" setting. The high level limit may be triggered by, for example, the headlight of an oncoming train, or by reflected light from the front headlight 36 when the locomotive 10 is stopped behind the rear end of a train on the same track. The sensitivity or high and low thresholds can be adjusted by switch or similar control, or through the external controller 58.

In the same manner the lighting controller 46 would control the brightness of the rear headlight 38 using input from the rear photoelectric sensor 54 when the locomotive 10 is operating in the reverse direction in low light conditions with the rear headlight 38 on a high setting.

Figure 6:
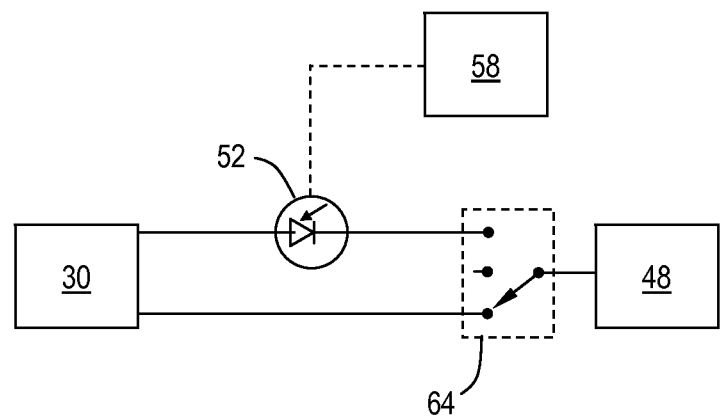
FIG. 6 is a block diagram of a photoelectric light control circuit.

In addition to or as an alternative to the integrated photoelectric sensor control described above, the photoelectric sensors 52, 54 may be directly coupled to one or more parts of the lighting system using dedicated circuits. FIG. 6 shows an example of a such a circuit used to connect the platform lights 30 to the power source 48. A switch 64 has an "off" position, an "on" position in which power is continuously supplied to the platform lights 30, and an "auto" position in which the power source 48 is coupled to the platform lights 30 through one of the photoelectric sensors 52. With the switch 64 in the auto position, power is supplied to the platform lights 30 whenever the light detected by the photoelectric sensor 52 reaches a low level threshold. Whenever a high level threshold is reached, power is disconnected from the platform lights 30. Reverse logic is also applicable wherein a low level threshold is used to extinguish the lights and a high level threshold is used to illuminate the lights. The sensitivity or high and low thresholds can be adjusted by a switch or similar control or through an external programmer 58. An identical dedicated circuit may be provided for each portion of the lighting system 28 which is to be separately controlled.

In addition to or as an alternative to the geo-zone and photoelectric sensor control methods described above, the position of the locomotive's operating controls may be used to automatically control portions of the lighting system 28 whose state (on or off) is directly related to locomotive movement and direction. This method of control is particularly applicable to the front and rear illuminated number boards 32 and 34, front and rear headlights 36 and 38, and front and rear ditch lights 40 and 42.

The lighting controller 46 contains a programmable database that defines operational requirements for designated portions of the locomotive lighting system 28. With the associated switch 50 is in the auto position, the lighting controller 46 receives signals from various locomotive controls. The lighting controller 46 then processes these signals and determines the required action based on database entries.

The locomotive reverser 56 (see FIG. 4) is an example of an operator control that can be used to control various locomotive lighting systems. When the reverser handle is removed from the reverser 56, the power to the designated portion of the lighting system 28 is programmed to be disconnected. This would be indicative of an unoccupied locomotive 10. Inversely, when the reverser handle is inserted and centered in the reverser 56, the power to the designated portion of the lighting system 28 is supplied. Another option would be to supply full power to some parts of the lighting system 28 and partial power to others. For example, the front and rear number boards 32 and 34 can be programmed to be fully illuminated while front and rear headlights 36 and 38 can be programmed to operate in the dim setting. The lighting controller 46 can also be programmed to disable ditch lights 40 and 42 when neither the front or rear headlight 36 or 38 is on the high setting.

When the reverser handle is moved to the forward position, the designated parts of the lighting system 28 would be fully powered by the lighting controller 46. For example, the front and rear number boards 32 and 34 would be fully illuminated and the front headlight 36 would be on the high setting. The lighting controller 46 can be programmed to supply power to the front ditch lights 40 if required.

When the reverser handle is moved to the reverse position, the designated parts of the lighting system 28 would be fully powered by the lighting controller 46. The front and rear number boards 32 and 34 would be fully illuminated and the rear headlight 38 would be on the high setting. The lighting controller 46 can be programmed to supply power to the rear ditch lights 42 if required.

Figure 7:
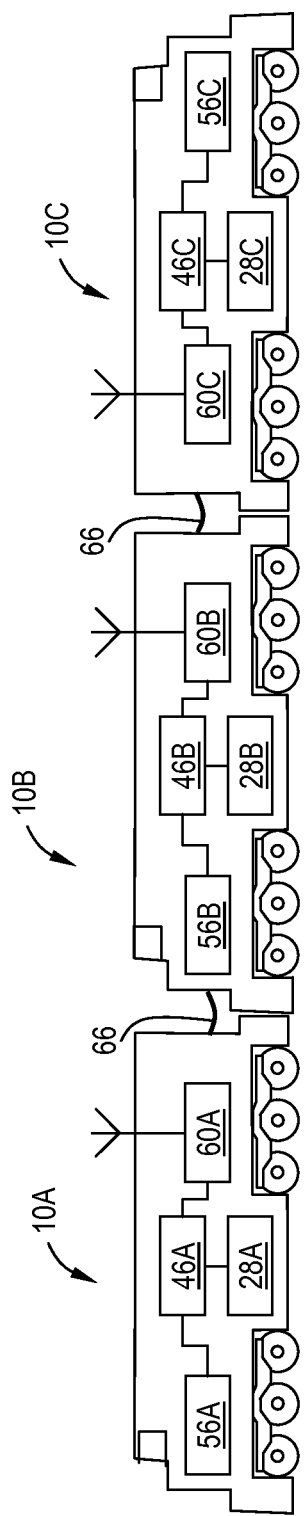
FIG. 7 is a schematic side view of three locomotives coupled in a consist.

Operation based on locomotive control can be used to control the lighting systems of multiple locomotives within a consist. FIG. 7 depicts a consist of three locomotives 10, designated 10A, 10B, and 10C. For purposes of explanation, locomotive 10A is designated the lead unit, and locomotives 10B and 10C are designated trailing units. Three locomotives 10A-10C are used merely as an example. The principles described herein are generally applicable to any consist of two or more locomotives. Also, the locomotives forming a consist need not be grouped together at the front of the train, but may be distributed throughout the train in any number or location. Each of the locomotives 10A, 10B, 10C incorporates a lighting system 28A, 28B, and 28C, reversers 56A, 56B, and 56C, lighting controllers 46A, 46B, and 46C, and the other control apparatus as described above and shown in FIG. 4 (only pertinent portions of this apparatus are shown in FIG. 7). The lighting controllers 46A-46C on each locomotive 10A-10C in the consist each contain a database that defines operational requirements for designated portions of the respective lighting system 28A-28C under various scenarios. With the associated switches 50 in the auto position, the lighting controllers 46A-46C are capable of receiving signals from numerous locomotive controls, then processing these signals and determining the required actions to invoke on the respective lighting system 28A-28C based on database entries. The lighting controllers 46A-46C are also configured so that they can communicate data to each other over a intra-consist communications channel. For example, they may be connected together via one or more copper or fiber optic cables 66. Alternatively, lighting control signals may be sent over a wireless communication link using radio transceivers 60A, 60B, and 60C.

The lead unit 10A serves as a master and the trailing units 10B and 10C serve as slaves relative to control of the lighting systems 28A-28C. In other words, the lighting controllers 46B and 46C would receive control signals from the lead unit 10A rather than directly responding to locomotive control and sensor inputs from the locomotives 10B and 10C. This permits the entire consist to operate as a single unit. The lighting controllers 46A-46C are programmed to respond to the presence or absence of the reverser handle. When used this way the reverser may be considered a designation apparatus. When present, the associated locomotive 10 is considered a lead unit, and when removed, the associated locomotive 10 is unoccupied or a trailing unit in a consist. In the illustrated example, the reverser handle would be installed only in the locomotive 10A.

Existing railroad operating rules pertaining to the operation of locomotive lighting systems typically apply to the lead unit 10A or the unit facing the direction of travel. When locomotives 10 are added or removed from the consist at a later time their lighting systems 28 must be controlled as well. Trains are often times required to stop along their routes and pick up or set off railroad cars. This requires disconnecting one or more locomotives 10 in the consist or the entire consist from the rest of the train. Therefore, what once was the lead unit in a consist can become the trailing unit.

In operation, a control signal is transmitted from the lead unit 10A to the trailing units 10B via the intra-consist communications channel. The lighting controllers 46B, 46C in each of the trailing units 10B and 10C process the control signal and compare it to their own onboard programmable databases to determine required action to invoke on the locomotive lighting systems 28B and 28C.

In this example the platform lights 30, cab lights 31, operator display lights 33, engine compartment lights 43, front and rear illuminated number boards 32 and 34, front and rear headlights 36 and 38, and front and rear ditch lights 40 and 42 of the trailing units 10B and 10C would not be powered (assuming that the associated switches 50 were in the auto position).

When the reverser handle in the lead unit 10A is moved to the forward position, the designated portions of the lighting system 28A of lead unit 10A would be fully powered by the lighting controller 46A. For example, the front number boards 32 would be fully illuminated and the front headlight 36 would be on high or bright. The lighting controller 46 can also be programmed to illuminate the locomotive's front ditch lights 40. The lighting systems 28B, 28C on the trailing units 10B, 10C would remain unchanged.

When the reverser handle is moved to the reverse position in locomotive 10A, a signal is sent to locomotives 10B and 10C indicating that the lead unit's reverser handle is in the reverse position. In response, the trailing unit's lighting controllers 46B and 46C access their programmable databases and determine the correct lighting configuration for the locomotive lighting systems 28B and 28C. No lighting change would occur on an intermediate trailing unit such as locomotive 10B. However, changes would occur to the lighting system 28C on locomotive 10C which is the last trailing unit in the consist. For example, the following changes can be programmed to automatically occur in the lighting systems 28A-28C of the consist: (1) Front headlight 36 on locomotive 10A changes to dim; (2) Front ditch lights 40 on locomotive 10A turn off; (3) Front number boards 32 on locomotive 10A turn off; (4) Front headlight 38 on locomotive 10C operates at high or bright; (5) Ditch lights 40, 42 on locomotive 10C turn on; and (6) Front illuminated number boards 32 on locomotive 10C turn on. The previous lighting system configuration would be restored whenever the reverse handle in locomotive 10A is set to the forward or center position.

As another operational example, the train might be required to stop and pick up or set off railroad cars. This requires a reverse movement in which locomotive 10C becomes the temporary lead unit. The reverser handle on the reverser 56 in locomotive 10A would be set to the center position and removed. The reverser handle is inserted in the reverser 56 of locomotive 10C making it the temporary lead unit. For example, the following changes can automatically occur in the consist: (1) Front headlight 36 on locomotive 10A set to dim or turned off; (2) Front ditch lights 40 on locomotive 10A turned off; (3) Front number boards 32 on locomotive 10A turned off; (4) Front headlight set to dim on locomotive 10C if reverser handle is in the center position; (5)

Front headlight 36 of locomotive 10C on high setting if reverser handle is in the forward position; (6) Front ditch lights 40 turned on in locomotive 10C; and (7) Front number boards 32 on locomotive 10C turned on. The previous lighting system configuration would be restored whenever the reverser handle is removed from the reverser 56 of locomotive 10C and reinserted in the reverser 56 of locomotive 10A.

Figure 8:
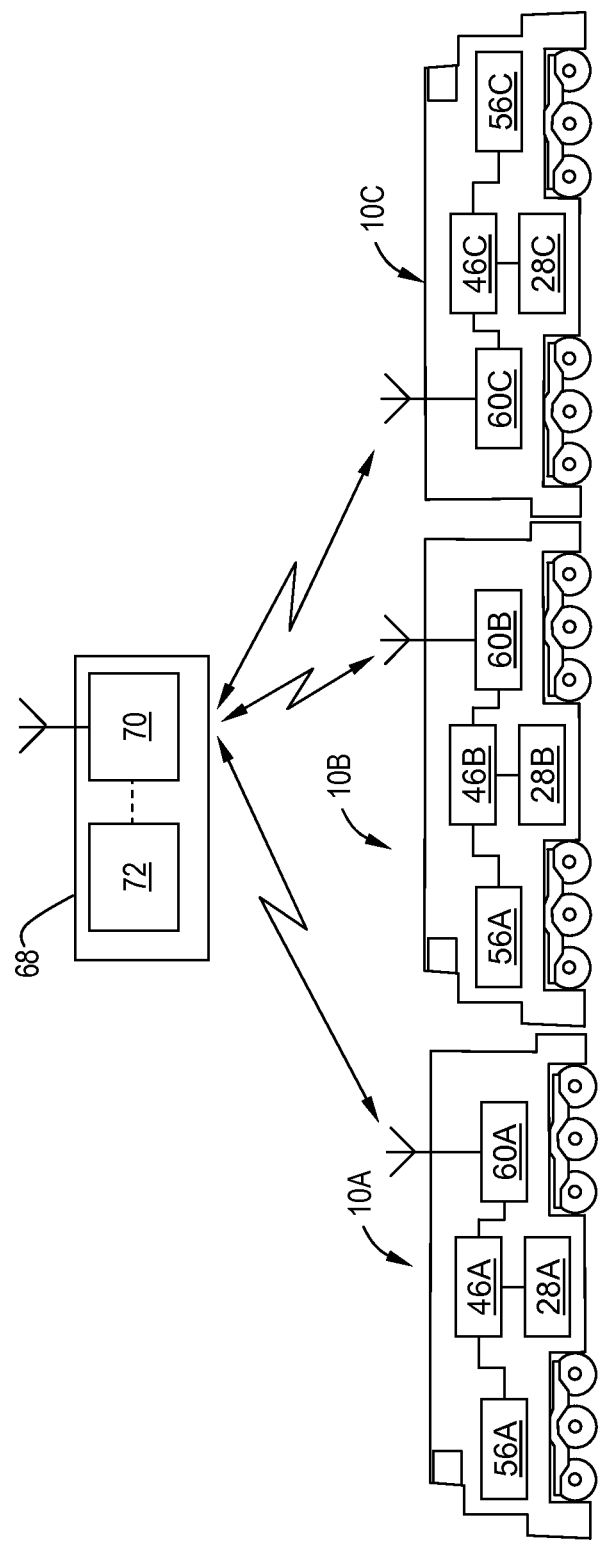
FIG. 8 is a schematic side view of three locomotives coupled in a consist, along with an offboard communications center.

The lighting systems 28 of the consist may also be controlled by offboard equipment. This type of control would operate as described above, except that one or more offboard (e.g., wayside) communication centers 68 with transceivers 70 and offboard computers 72 as described above would be provided (see FIG. 8).

In operation, the transceivers 60A-60C installed on the locomotives 10A-10C in the consist repeatedly receive data from the positioning units 51 indicating the locomotives' current geographical location. The transceivers 60A-60C forward the locomotive's position data to offboard computer 72 through transceiver 70. The offboard computer 72 contains a database with specific lighting instructions for each locomotive 10A-10C. If the offboard computer 72 determines a change in the consist's lighting system is required, a wireless message is sent from the communication center 68 to the locomotives 10A-10C in the consist to command a change in the consist lighting systems 28A-28C.

Various control rules and programming may be used by the offboard computer 72. For example, the offboard computer 72 may be used to determine whether the locomotives 10A-10C are in a geo-zone in the manner described above, and then transmit appropriate commands to the locomotives 10A-10C.

As another option, the offboard computer 72 may contain a comprehensive database listing sunrise and sunset times for various geographical locations. Using the position data, the offboard computer 72 can then determine the locomotive's local time of day. If the database criteria for the comparison of position data to local time of day determines action is required, the offboard computer 72 would then generate a wireless message to the locomotives 10A-10C to turn on or turn off the designated portions of their lighting systems 28A-28C.

Any of the methods described above may be combined as desired to result in the desired lighting system operation. For example, control of some portions of a lighting system 28 may be based on the photoelectric sensors 52 and 54, while control of other portions is based on the locomotive reverser 56.

This invention described above provides the several benefits over conventional manually controlled locomotive or rail vehicle lighting systems. It will increase safety and rule compliance by insuring locomotive lighting systems are configured per railroads operating rules. It will decrease maintenance costs and fuel consumption by automatically extinguishing locomotive lighting systems when applicable thus extending bulb life and reducing locomotive electric generation. It will reduce liability and litigation costs associated with accidents by insuring that the locomotive lighting systems are always configured properly; and will improve operator focus by reducing distractions Furthermore, the invention will permit railroads to customize individual locomotive lighting configurations under a multitude of varying conditions and locations; and is required for remote train control where no crew members are present on the locomotive (s).

The foregoing has described a vehicle lighting control system and methods for its operation. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. An apparatus for operating a lighting system of the type including one or more lighting devices disposed on an off-highway vehicle, the apparatus comprising:
    one or more input devices carried by the off-highway vehicle, each of the input devices operable to detect an operating condition of the off-highway vehicle and to generate a signal representative thereof; and
    a lighting controller operatively coupled to the one or more input devices and to the lighting devices;
    wherein the lighting controller is programmed to selectively power the lighting devices from an electrical power source of the off-highway vehicle based on predetermined responses to the signals from the input devices, wherein the predetermined responses to the signals from the input devices are based on one or more railroad operating rules which dictate the use of the lighting devices based on the status of the off-highway vehicle as a lead or trailing unit within a consist comprising two or more off-highway vehicles.

2. The apparatus of claim 1 wherein at least one of the one or more input devices is a photoelectric sensor exposed to ambient lighting conditions.

3. The apparatus of claim 2 wherein the lighting controller is programmed to power one or more of the lighting devices based on a light level detected by the photoelectric sensor.

4. The apparatus of claim 1 wherein at least one of the one or more input devices is a positioning unit operable to determine a location of the off-highway vehicle.

5. The apparatus of claim 4 wherein the lighting controller includes a database of geo-zones, and is programmed to power selected lighting devices when the off-highway vehicle's location as determined by the positioning unit is within one of the geo-zones.

6. The apparatus of claim 4 further including:
    a first transceiver carried by the off-highway vehicle and operably connected to the lighting controller; and
    a communications center located external to the off-highway vehicle, the communications center including an offboard computer and a second transceiver in communication with the first transceiver, the offboard computer programmed to:
    receive the signals from the input devices;
    determine a response to the signals from the input devices; and
    transmit one or more commands to the first transceiver;
    wherein the lighting controller is programmed to selectively power the lighting devices from the electrical power source of the off-highway vehicle based at least in part on the one or more commands of the offboard computer.

7. The apparatus of claim 6 wherein:
    the offboard computer includes a database of geo-zones, and is programmed to receive the location reported by the off-highway vehicle and determine if the off-highway vehicle's location is within one of the geo-zones, and if so, transmit an identification of the geo-zone to the off-highway vehicle; and
    the lighting controller is programmed to power selected lighting devices based on the identification of the geo-zone.

8. The apparatus of claim 1 wherein at least one of the one or more input devices is a reverser control operable to change the direction of movement of the off-highway vehicle.

9. An apparatus for operating a consist of two or more off-highway vehicles which are mechanically coupled together, each off-highway vehicle having a lighting system including one or more lighting devices, the apparatus comprising:
one or more input devices carried by each off-highway vehicle, each of the input devices operable to detect an operating condition of the off-highway vehicle and to generate a signal thereof;
a lighting controller carried by each off-highway vehicle and operatively coupled to the input devices and to the lighting devices of that off-highway vehicle;
a communications channel operable to transfer data between the lighting controllers; and
designation apparatus operable to designate one of the off-highway vehicles as a lead unit and the remaining off-highway vehicles as trailing units, wherein the designation apparatus is a reverser control disposed in one of the off-highway vehicles, which is operable to change the direction of movement of the off-highway vehicle;
wherein each of the lighting controllers is programmed to selectively power the lighting devices of the associated off-highway vehicle from an electrical power source of the off-highway vehicle based on predetermined responses to the signals from the input devices of the lead unit which are transmitted over the communications channel from the lighting controller of the lead unit to the remaining lighting controllers in the consist.

10. The apparatus of claim 9 wherein the communications channel is a physical connection.

11. The apparatus of the claim 9 wherein the communications channel is a wireless link between transceivers carried by each of the off-highway vehicles.

12. The apparatus of claim 9 wherein at least one of the input devices of each off-highway vehicle is a photoelectric sensor exposed to ambient lighting conditions.

13. The apparatus of claim 12 wherein each lighting controller is programmed to power one or more of the lighting devices based on a comparison of the light level sensed by the photoelectric sensor to a predetermined limit.

14. The apparatus of claim 9 wherein at least one of the input devices of each off-highway vehicle is a positioning unit operable to determine a location of the off-highway vehicle.

15. The apparatus of claim 14 wherein each of the lighting controllers includes a database of geo-zones, and is programmed to power selected lighting devices when the off-highway vehicle's location as determined by the positioning unit is within one of the geo-zones.

16. The apparatus of claim 9 wherein at least one of the input devices is a reverser control operable to change the direction of movement of the off-highway vehicle.

17. The apparatus of claim 9 further including:
a transceiver carried by each of the off-highway vehicles and operably connected to the lighting controller of that off-highway vehicle; and
a communications center located external to the off-highway vehicle, the communications center including an offboard computer and a second transceiver in communication with the off-highway vehicle's transceiver, the offboard computer programmed to:
receive the signals from the input devices;
determine a response to the signals from the input devices; and
transmit a command to the first transceiver;
wherein the lighting controller of each off-highway vehicle is programmed to selectively power the lighting devices of that off-highway vehicle from an electrical power source of the off-highway vehicle, based at least in part on the commands of the offboard computer.

18. The apparatus of claim 17 wherein:
the offboard computer includes a database of geo-zones, and is programmed to receive the location reported by the off-highway vehicle and determine if the off-highway vehicle's location is within one of the geo-zones, and if so, transmit an identification of the geo-zone to the off-highway vehicle; and
the lighting controller is programmed to power selected lighting devices based on the identification of the geo-zone.

19. The apparatus of claim 17 wherein the offboard computer includes a geographical database, and is programmed to receive the location reported by the off-highway vehicle and determine the off-highway vehicle's local time of day; and transmit a lighting command appropriate to the time of day to the off-highway vehicle.

20. A method for operating a lighting system of the type including one or more lighting devices disposed on an off-highway vehicle, the method comprising:
using one or more input devices disposed on the off-highway vehicle to generate one or more signals indicative of respective operating conditions of the off-highway vehicle;
receiving the signals at a lighting controller operatively coupled to the lighting devices; and
using the lighting controller, coupling the lighting devices to the electrical power source based on predetermined responses to the signals from the input devices, wherein the predetermined responses to the signals from the input devices are based on one or more railroad operating rules which dictate the use of the lighting devices based on the status of the off-highway vehicle as a lead or trailing unit within a consist comprising two or more off-highway vehicles.

21. The method of claim 20 wherein one or more of the input devices is a photoelectric sensor, the method further comprising powering one or more of the lighting devices based on the light level detected by a photoelectric sensor.

22. The method of claim 20 comprising powering one or more of the lighting devices based a location of the off-highway vehicle.

23. The method of claim 20 comprising powering one or more of the lighting devices based a status of a reverser control operable to change the direction of movement of the off-highway vehicle.

24. The method of claim 20 further including:
transmitting the signals generated by the input devices to a communications center located external to the off-highway vehicle, the communications center including an offboard computer;
using the offboard computer to:
receive the signals from the input devices;
determine a response to the signals from the input devices; and
transmit a command to the off-highway vehicle; and
using the lighting controller, selectively power the lighting devices from an electrical power source of the off-highway vehicle based at least in part on the commands of the offboard computer.

25. The method of claim 20 wherein the off-highway vehicle forms a part of a consist of two or more off-highway vehicles which are mechanically coupled together, each off-highway vehicle having a lighting system including one or more lighting devices, the method comprising:

designating one of the off-highway vehicles as a lead unit and the remaining off-highway vehicles as trailing units;

using one or more input devices disposed on the lead unit to generate a signal indicative of a operating condition of the lead unit;

receiving the signals at a lighting controller of the lead unit which is operatively coupled to the lighting devices; and using the lighting controller, transmitting lighting commands over a communications channel to lighting controllers carried by the trailing units;

coupling the input devices to the electrical power source based on predetermined responses to the signals from the input devices, using the lighting controllers, selectively powering the lighting devices of the associated off-highway vehicle from an electrical power source of the off-highway vehicle in response to the lighting commands.

26. The method of claim 25 wherein the off-highway vehicle is designated as a lead unit by determining a setting of a reverser control operable to change the direction of movement of the off-highway vehicle.

27. The method of claim 20 wherein the off-highway vehicle forms a part of a consist of two or more off-highway vehicles which are mechanically coupled together, each off-highway vehicle having a lighting system including one or more lighting devices, the method comprising:

designating one of the off-highway vehicles as a lead unit and the remaining off-highway vehicles as trailing units;

using one or more input devices disposed on the off-highway vehicles to generate a signal indicative of an operating condition of the off-highway vehicles;

transmitting the signals generated by the input devices to a communications center located external to the consist, the communications center including an offboard computer;

using the offboard computer to:
  receive the signals from the input devices;
  determine a response to the signals from the input devices; and
  transmit a command to the off-highway vehicles;

receiving the signals at lighting controllers carried by the off-highway vehicles which are operatively coupled to the lighting devices; and using the lighting controllers, selectively powering the lighting devices of the associated off-highway vehicles from an electrical power source of the off-highway vehicles in response to the lighting commands.

* * * * *